(12) United States Patent
Mika et al.

(10) Patent No.: US 11,951,539 B2
(45) Date of Patent: Apr. 9, 2024

(54) MODIFICATION OF METAL JETTING COMPOSITIONS AND METHODS THEREOF

(71) Applicant: Additive Technologies, LLC, Palm City, FL (US)

(72) Inventors: Mariusz Tadeusz Mika, Raleigh, NC (US); Peter M. Gulvin, Webster, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 148 days.

(21) Appl. No.: 17/462,804

(22) Filed: Aug. 31, 2021

(65) Prior Publication Data

US 2023/0066534 A1 Mar. 2, 2023

(51) Int. Cl.
*B33Y 10/00* (2015.01)
*B22D 23/00* (2006.01)
*B22F 10/22* (2021.01)
*B22F 12/53* (2021.01)
*B33Y 30/00* (2015.01)

(52) U.S. Cl.
CPC ............ *B22D 23/003* (2013.01); *B22F 10/22* (2021.01); *B22F 12/53* (2021.01); *B33Y 10/00* (2014.12); *B33Y 30/00* (2014.12)

(58) Field of Classification Search
CPC ........ B22F 10/22; B22F 12/53; B22F 10/322; B33Y 10/00; B33Y 30/00
See application file for complete search history.

(56) References Cited

U.S. PATENT DOCUMENTS

| | | | | |
|---|---|---|---|---|
| 4,080,223 A | * | 3/1978 | Schoerner | C22C 21/00 148/438 |
| 2013/0292081 A1 | * | 11/2013 | Hosek | B22F 3/1039 164/271 |
| 2017/0087632 A1 | * | 3/2017 | Mark | B22D 27/003 |
| 2020/0282461 A1 | * | 9/2020 | Fang | B05B 7/1486 |
| 2023/0063825 A1 | | 3/2023 | Mika et al. | |

* cited by examiner

*Primary Examiner* — Anthony M Liang
*Assistant Examiner* — Maxwell Xavier Duffy
(74) *Attorney, Agent, or Firm* — MH2 Technology Law Group LLP

(57) ABSTRACT

A method for metal jetting is disclosed. The method for metal jetting includes introducing a first gas into an outer nozzle of an ejector nozzle from a first gas source introducing an additive to the first gas from a second source, combining the additive with the first gas. The method for metal jetting also includes ejecting a droplet of molten metal printing material from the ejector nozzle. The method for metal jetting includes allowing the additive to react with the droplet of molten metal printing material to form a modified molten metal printing material.

19 Claims, 6 Drawing Sheets

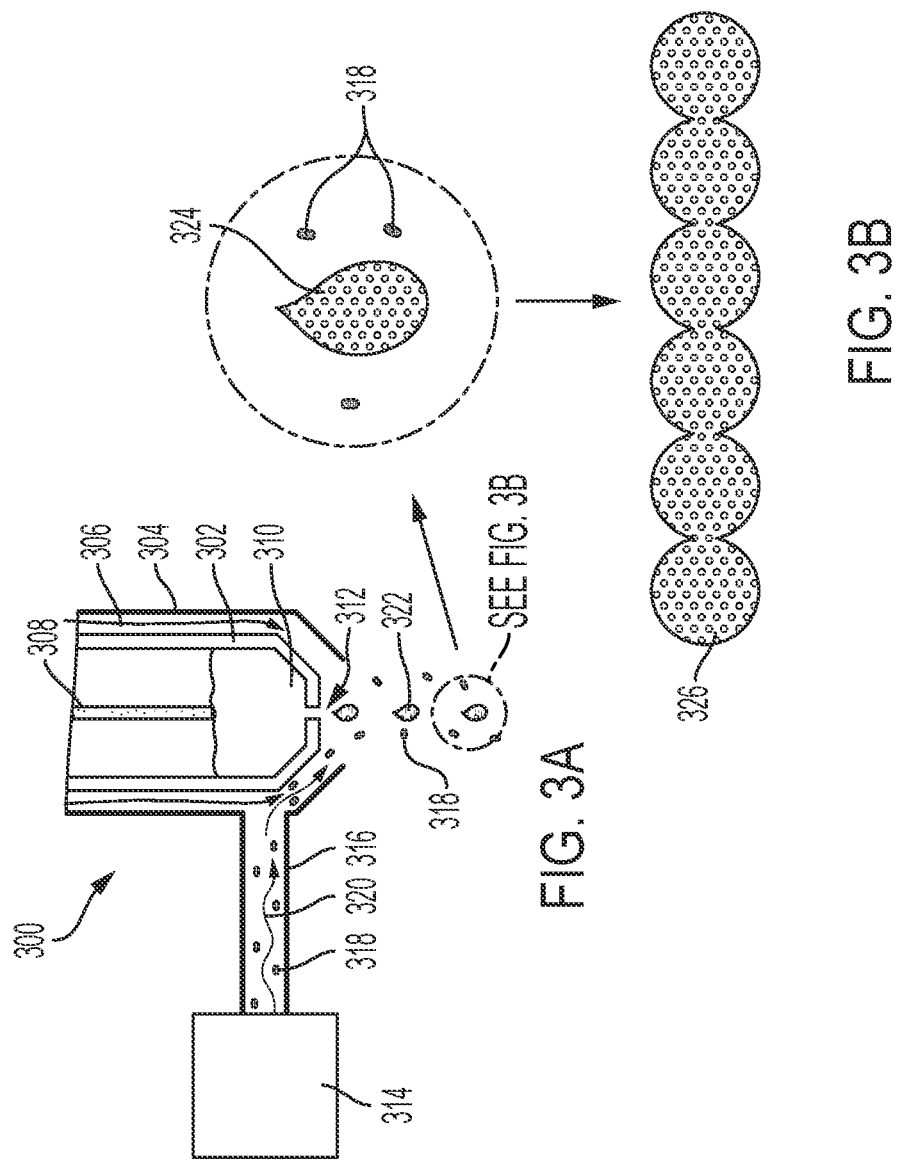

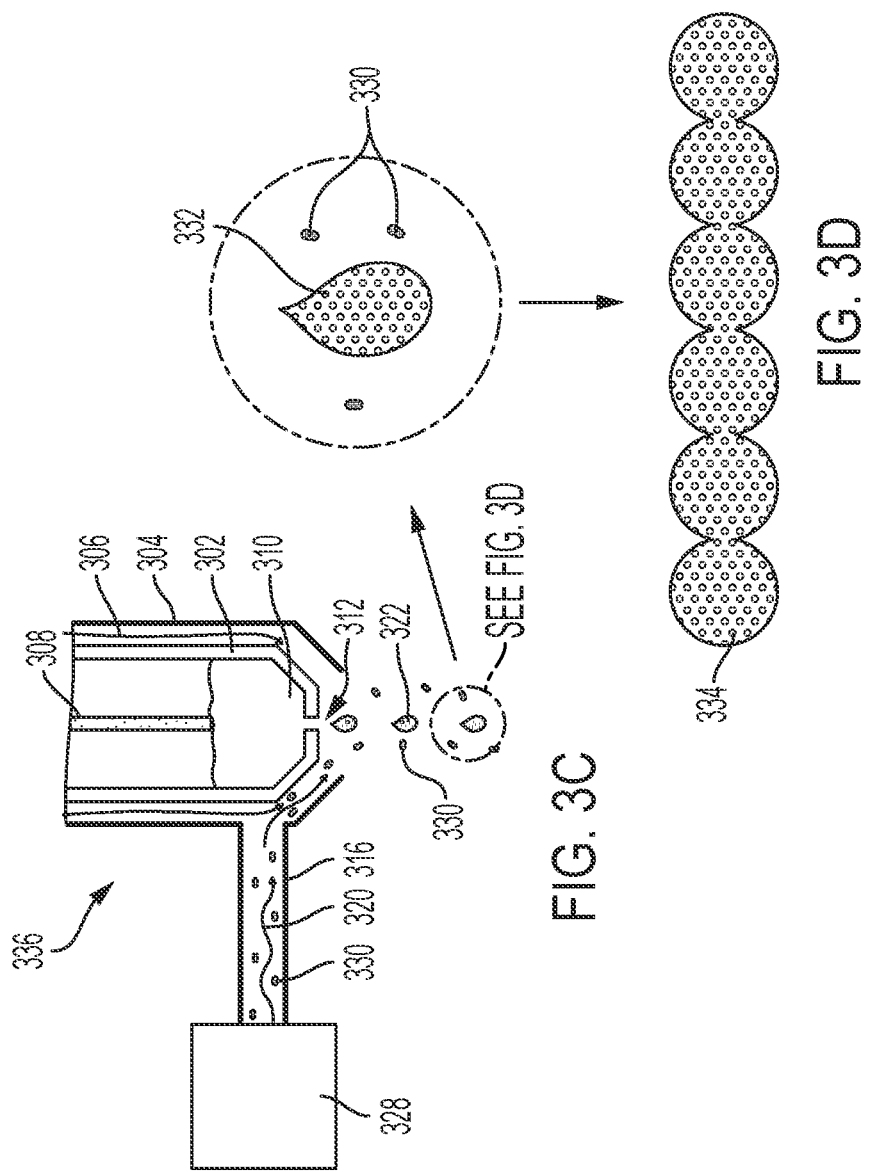

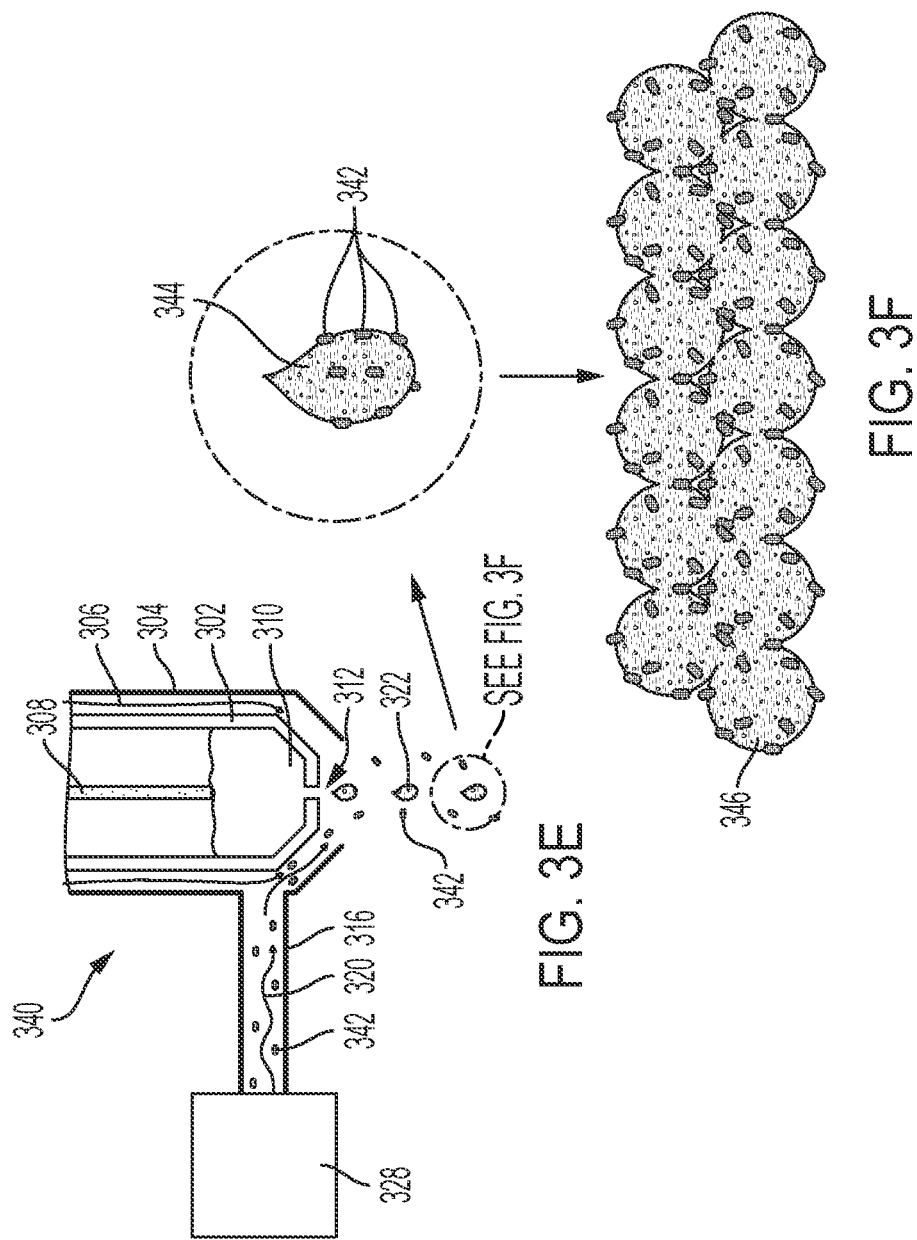

MODIFICATION OF METAL JETTING COMPOSITIONS AND METHODS THEREOF

TECHNICAL FIELD

The present teachings relate generally to drop-on-demand jetting and, more particularly, to apparatus and methods for jetting modified compositions.

BACKGROUND

An additive manufacturing method involving drop-on-demand (DOD) or three-dimensional (3D) printer builds (e.g., prints) a 3D object from a computer-aided design (CAD) model, usually by successively depositing material layer upon layer. A drop drop-on-demand (DOD), particularly one that prints a metal or metal alloy, ejects a small drop of liquid aluminum alloy when a firing pulse is applied. Using this technology, a 3D part or other materials can be created from aluminum, another alloy, or material by ejecting a series of drops which bond together to form a continuous part. For example, a first layer may be deposited upon a substrate, which is configured to support deposited ink or printed 3D parts and then a second layer may be deposited upon the first layer. One particular type of 3D printer is a magnetohydrodynamic (MHD) printer, which is suitable for jetting liquid metal layer upon layer to form a 3D metallic object. Magnetohydrodynamic refers to the study of the magnetic properties and the behavior of electrically conducting fluids.

While this general method of printing is an efficient additive manufacturing technology, it is desirable to further improve the quality, cost effectiveness and overall process productivity. For example, it may be advantageous to modify the composition of a 3D part from one layer to another, introduce alterations of composition or structure in a part while printing within a single process, or include various and variable additives into a printing material during the printing process. Thus, a method of and apparatus for in situ modification within a metal jet printing drop-on-demand or 3D printer or additive manufacturing process is needed.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for metal jetting is disclosed. The method for metal jetting also includes introducing a first gas into an outer nozzle of an ejector nozzle from a first gas source introducing an additive to the first gas from a second source, combining the additive with the first gas. The method for metal jetting also includes ejecting a droplet of molten metal printing material from the ejector nozzle. The method for metal jetting also includes allowing the additive to react with the droplet of molten metal printing material to form a modified molten metal printing material.

Implementations of the method for metal jetting where the first gas may include the use of an inert gas. The method for metal jetting may include introducing an additive to the first gas which may further include introducing a second gas from a second gas source. The second gas may include an inert gas, for example, carbon monoxide. Introducing an additive to the first gas from a second source may further include aerosolizing a liquid to form an aerosolized liquid. The aerosolized liquid may include a sodium chloride solution. Introducing an additive to the first gas from a second source further may include combining the aerosolized liquid with a second gas from a second gas source. Introducing an additive to the first gas from a second source further may include combining a powder with a second gas from a second gas source to suspend the powder in the second gas, and introducing the combined powder and second gas to the first gas. The powder may include a water-soluble powder. The powder may include a ferromagnetic material. The ferromagnetic material further may include iron. The powder may include nickel, platinum, palladium, or a combination thereof. Introducing an additive to the first gas from a second source further may include heating a solid to form a vaporized solid. Introducing an additive to the first gas from a second source further may include combining the vaporized solid with a second gas from a second gas source. The vaporized solid may include a grain refiner. The vaporized solid may include strontium. The vaporized solid may include calcium.

Another method for metal jetting is disclosed. The method for metal jetting may include introducing a first inert gas into an outer nozzle of an ejector nozzle from a first gas source, introducing an additive to the first inert gas from a second source, where the additive is a second gas, and combining the additive with the first gas. The method for metal jetting may include ejecting a droplet of molten metal printing material from the ejector nozzle. The method for metal jetting also includes allowing the additive to react with the droplet of molten metal printing material to form a modified molten metal printing material. The method for metal jetting also includes depositing a droplet of the modified molten metal printing material onto a substrate or a solid printing material.

Another method for metal jetting is disclosed. The method for metal jetting also includes introducing a first inert gas into an outer nozzle of an ejector nozzle from a first gas source, combining a powder with a second inert gas from a second inert gas source to suspend the powder in the second inert gas, and combining the powder suspended in the second inert gas with the first inert gas. The method for metal jetting also includes ejecting a droplet of molten metal printing material from the ejector nozzle. The method for metal jetting also includes allowing the combination of the first inert gas and the powder suspended in the second inert gas to react with the droplet of molten metal printing material to form a modified molten metal printing material. The method for metal jetting also includes depositing a droplet of the modified molten metal printing material onto a substrate or a solid printing material.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 3A-3F are a series of side cross-sectional views of a single liquid ejector jet configured for jetting modified metal compositions, illustrating various embodiments of metal modification, according to one or more embodiments.

Figure 1:
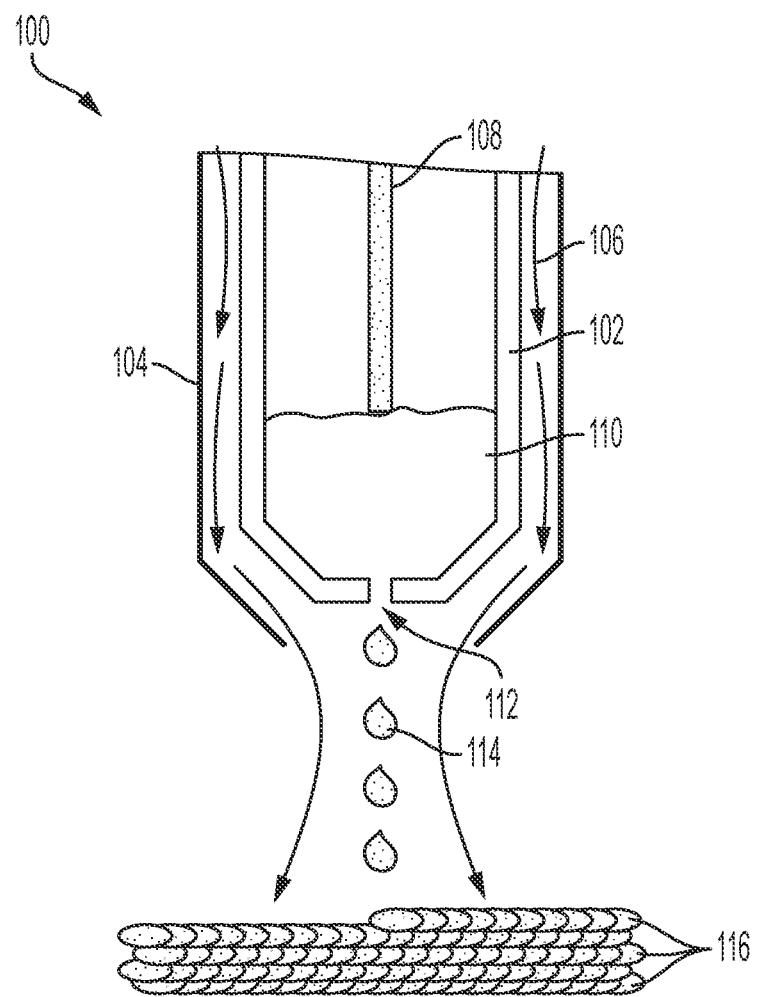
FIG. 1 depicts a schematic cross-sectional view of a single liquid ejector jet of a 3D printer (e.g., a MHD printer and/or multi-jet printer), according to an embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Current liquid metal jetting additive manufacturing processes use a metal wire or other printing material, retained as or heated to a liquid within a printing ejector to eject liquid drops which solidify to produce quality parts in a timely and cost-efficient manner. In order to further improve quality, reduce cost, or decrease cycle time of additive manufacturing processes, in situ modifications may be desired.

Embodiments as described herein include apparatus and methods to add or combine substances to a cover gas for the purpose of modifying the molten or liquid printing material in situ to provide instantaneous or near instantaneous changes to the physical or chemical composition of the printing material. These substances may be added to a carrier gas via chemical or physical means, including but not limited to boiling, evaporation, mechanical mixing, or chemical reaction. The carrier gas may then be mixed or combined with the cover gas used for metal jetting thereby combining or incorporating the substance into the printing material, and thus into the jetting process. Certain embodiments include the in situ incorporation of substances including but not limited to alloying elements such as magnesium, deoxidizers such as hydrogen, ceramic particles or fibers such as alumina to make metal matrix composites in situ, or nanoparticles such as nano-alumina to make metal matrix nanocomposites in situ.

As used herein, the term "cover gas" refers to a gas, in some embodiments, an inert gas which is introduced into and around an ejector, nozzle, or printing system with the intended purpose of providing a shield or shroud of gas around the ejector, nozzle, or printing system. Under standard conditions, this cover gas should provide an inert atmosphere around a metal jetting or other printing operation using such an ejector or nozzle.

The term "modified printing material" or "modified molten printing material," as used herein, may be used interchangeably with "modified metal printing material" or "modified liquid printing material," and refers to molten or liquid printing materials as jetted by apparatus or systems described herein where the printing material that is ejected or jetted by the printing system, nozzle, or ejector is modified by exposure to a secondary additive, reactant, or other material. At the time of ejection, or nearly instantaneously thereafter, this exposure modifies the original liquid or molten printing material in a chemical, compositional, or physical manner, resulting in a modified printing material.

The modification may take place immediately, or over time once a printing material is deposited on a substrate or other layer of previously deposited printing material, and the modified printing material is solidifying, drying or curing. This modification of the printing material may result in the creation of a composite, nanocomposite, alloy, mixture, or other modification known to one skilled in the art.

FIG. 1 depicts a schematic cross-sectional view of a single liquid ejector jet of a 3D printer (e.g., a MHD printer and/or multi-jet printer), according to an embodiment. The 3D printer or liquid ejector jet 100 may include a body or pump chamber, or a "one-piece" pump within an outer ejector housing, also referred to as a nozzle 102. The liquid ejector jet 100 may define an inner volume, also referred to as an internal or inner cavity, which retains a printing material 110 in the inner volume of the liquid ejector jet 100. The printing material 110 may be or include a metal, a polymer, or the like. For example, the printing material 110 may be or include aluminum or aluminum alloy, introduced via a printing material supply or spool of a printing material wire feed 108, which as shown is an aluminum wire. Certain embodiments may not utilize a wire feed introduction of printing material, but may alternatively include a powder feed, liquid feed, or other method or manner of introducing a printing material into the liquid ejector jet 100. The liquid ejector jet 100 further includes a gas shield 104, which surrounds the nozzle 102 portion of the liquid ejector jet 100 whereby a cover gas 106 is introduced around the nozzle 102 of the liquid ejector jet 100 in order to surround the printing operation with an inert cover gas 106, which may be used to regulate temperature and atmosphere around the liquid ejector jet 100. In certain embodiments, one or more heating elements, not shown here, may be distributed around the pump chamber or nozzle 102 to provide an elevated temperature source and maintain the printing material 110 in a molten state during printer operation. The heating elements may be configured to heat or melt the printing material wire feed 108, thereby changing the printing material wire feed 108 from a solid state to a liquid state (e.g., printing material 110) within the inner volume of the liquid ejector jet 100.

The liquid ejector jet 100 may also include or be coupled to a power source, not shown herein, and one or more metallic coils enclosed in a pump heater that may be wrapped at least partially around the liquid ejector jet 100. The power source may be coupled to the coils and configured to provide an electrical current to the coils. An increasing magnetic field caused by the coils may cause an electromotive force within the liquid ejector jet 100, that in turn causes an induced electrical current in the printing material 110. The magnetic field and the induced electrical current in the printing material 110 may create a radially inward force on the printing material 110, known as a Lorenz force. The Lorenz force creates a pressure at an inlet of a nozzle orifice 112 of the liquid ejector jet 100. The pressure causes the printing material 110 to be jetted through the nozzle orifice 112 in the form of one or more liquid drops 114. These liquid printing material drops 114 land may form one or more layers of solidified droplets 116 to eventually form a 3D object.

The 3D printer liquid ejector jet 100 may also include a substrate, not shown herein, that is positioned proximate to (e.g., below) the nozzle orifice 112. The ejected drops 114 may land on the substrate and solidify to produce a 3D object. The 3D printer liquid ejector jet 100 may also include a substrate control motor that is configured to move the substrate while the drops 114 are being jetted through the nozzle orifice 112, or during pauses between when the drops 114 are being jetted through the nozzle orifice 112, to cause the 3D object to have the desired shape and size. The substrate control motor may be configured to move the substrate in one dimension (e.g., along an X axis), in two dimensions (e.g., along the X axis and a Y axis), or in three dimensions (e.g., along the X axis, the Y axis, and a Z axis). In another embodiment, the liquid ejector jet 100 and/or the nozzle orifice 112 may be also or instead be configured to move in one, two, or three dimensions. In other words, the substrate may be moved under a stationary liquid ejector jet 100, or the liquid ejector jet 100 may be moved above a stationary substrate. In yet another embodiment, there may be relative rotation between the liquid ejector jet 100 and the substrate around one or two additional axes, such that there is four or five axis position control. In certain embodiments, both the liquid ejector jet 100 and the substrate may move. For example, the substrate may move in X and Y directions, while the liquid ejector jet 100 moves up and/or down in a Y direction.

The 3D printer and accompanying liquid ejector jet 100 may also include one or more gas-controlling devices, which may be or include a source of cover gas 106, not shown here. The gas source may be configured to introduce a gas or a cover gas 106. The gas may be or include an inert gas or inert gas source, such as helium, neon, argon, krypton, and/or xenon. In another embodiment, the gas may be or include nitrogen. The gas may include less than about 10% oxygen, less than about 5% oxygen, or less than about 1% oxygen. In at least one embodiment, the gas may be introduced via a gas line which includes a gas regulator configured to regulate the flow or flow rate of one or more gases introduced into and/or around the liquid ejector jet 100 from the gas source. For example, the gas may be introduced at a location that is above the liquid ejector jet 100 and/or the heating element. This may allow the gas (e.g., argon) to form a shroud/sheath around the liquid ejector jet 100, the drops 114, the 3D object, and/or the substrate to reduce/prevent the formation of oxide (e.g., aluminum oxide) in the form of an air shield. Controlling the temperature of the gas may also or instead help to control (e.g., minimize) the rate that the oxide formation occurs.

Figure 2:
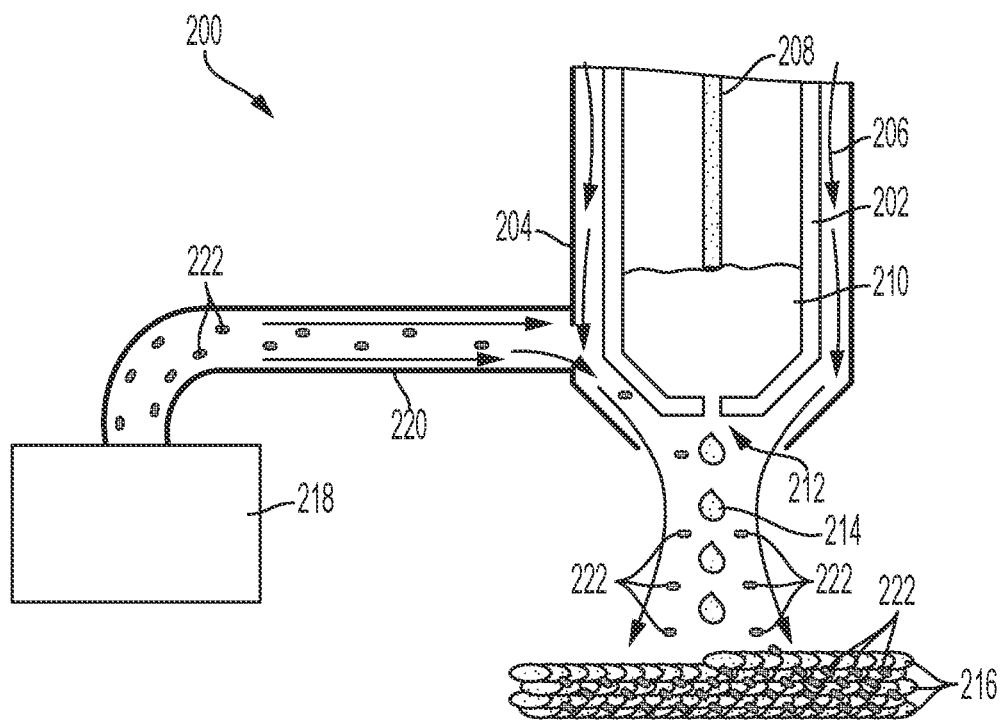
FIG. 2 is a schematic cross-sectional view of a single liquid ejector jet configured for jetting modified metal compositions, according to an embodiment.

FIG. 2 is a schematic cross-sectional view of a single liquid ejector jet configured for jetting modified metal compositions, according to an embodiment. A liquid ejector jet 200 is shown in FIG. 2, the liquid ejector jet 200 defining a nozzle 202 portion having a gas shield 204 surrounding the nozzle 202 portion of the liquid ejector jet 200. The gas shield 204 surrounds the nozzle 202 and contains a first gas 206, also referred to as a cover gas that surrounds the nozzle 202 and liquid ejector jet 200 with the first gas 206. This gas or air shield 204 provides an air shield around an external portion of the nozzle 202 as described previously. The liquid ejector jet 200 may define an inner volume, also referred to as an internal cavity, which retains a molten or liquid printing material 210 in the inner volume of the liquid ejector jet 200. The printing material 210 may be or include a metal, a polymer, or the like. For example, the printing material 210 may be or include aluminum or aluminum alloy, introduced via a printing material supply or spool of a printing material wire feed 208, which as shown is an aluminum wire. Certain embodiments may not utilize a wire feed introduction of printing material, but may alternatively include a powder feed, liquid feed, or other method or manner of introducing a printing material into the liquid ejector jet 200. The nozzle 202 of the liquid ejector jet 200 also defines a nozzle orifice 212. The printing material 210 retained within the nozzle 202 of the liquid ejector jet 200 is jetted through the nozzle orifice 212 in the form of one or more liquid drops 214. These liquid printing material drops 214 may be jetted on either a substrate, a previously jetted layer of drops or both and may form one or more layers of solidified droplets 216 to eventually form a 3D object. In the embodiment illustrated in FIG. 2, an additive source 218 is located in proximity to the nozzle 202. This additive source 218 is coupled to the nozzle 202 of the liquid ejector jet 200 by an additive inlet 220. The additive inlet 220 delivers an additive 222 from the additive source 218 to the gas shield 204 where the additive 222 combines with the first gas 206 and is then carried towards the nozzle 202 and nozzle orifice 212 to combine the additive 222 with the printing material modified droplets 214 of the liquid printing material 210 in proximity to an external portion of the nozzle 202. This process results in the additive 222 and printing material droplets 214 interacting via a chemical or physical mixing or reaction to create an in situ modified printing material. This in situ modified printing material may have a different composition than the original liquid printing material 210.

In certain embodiments, the additive source to be combined with a cover gas or the first gas 206 may deliver a second gas, a vaporized solid, an aerosolized liquid, a solid powder, or a combination thereof to be mixed with the cover gas and carried to an area in proximity around the nozzle orifice 212 of the nozzle 202 of the liquid ejector jet 200. In some embodiments, only a portion of the 3D printed part could have droplets or printing material having an in situ modification of the molten or liquid printing material, resulting in parts having only partially modified material. The modified portion could result in parts having a gradient of properties or compositions, as well as step-wise or boundary layers of variable printing material compositions and properties, or combinations of gradient, step-wise, or boundary layers. Certain embodiments where the additive is a gas may include a process and apparatus that provides the addition of carbon monoxide gas when printing steel parts from a molten liquid steel printing material which would result in localized carburization during printing. Parts resulting from this type of process would have higher strength and hardness where carburized and good ductility and toughness in the rest of the part. These properties may be highly desired in applications such as rotating shafts, gears, and other mechanical or structural systems. This example provides an advantage as compared to other processes as brittleness is often an issue associated with high strength alloys. The addition of nitrogen, ammonia, or other nitrogen containing gases to strong nitride forming alloys such as, but not limited to, aluminum, would result in the formation of aluminum nitride (AlN) or other hard ceramics which have highly desirable hardness, stiffness, and strength enabling the use of these alloys in new applications.

Certain embodiments where the additive is a vaporized solid include the addition of vaporized calcium, which may be generated by boiling calcium metal at a temperature exceeding 1484° C. in a separate furnace or other apparatus coupled to the liquid ejector jet 200 which would then carried by the carrier gas or cover gas and act as an oxygen getter or binding metal ion. This type of addition enables the jetting of oxygen-sensitive alloys that normally would not be able to be jetted without a vacuum or additional environmental controls. Other examples of vaporized solid additives may include vaporized strontium as a grain refiner in aluminum alloys, vaporized aluminum as a grain refiner in steel or stainless steel alloys, or a combination thereof. The addition of elements such as lithium (Li) to alloys such as aluminum are know to result in higher strength and toughness, both of which are highly desirable, however Al—Li alloys are difficult to manufacture. The process and methods as described may vaporize elements such as lithium and facilitate their deposition where necessary, thereby optimizing mechanical properties and cost.

Certain embodiments where the additive is a liquid or an aerosolized liquid may include the addition and subsequent condensation of nanoparticles or dispersions having a composition including nanoparticles or other dispersed materials. Examples of nanoparticles used in such a manner include carbon, aluminum oxide, silicon carbide, silicon dioxide, titanium dioxide, carbon nanotubes, titanium nitride or combinations thereof onto or interspersed within droplets or layers of any metal. The addition of nanoparticles such as silicon carbide (SiC), boron carbide ($B_4C$), aluminum oxide ($Al_2O_3$), titanium oxide ($TiO_2$), carbon, silicon dioxide ($SiO_2$), or similar materials suspended in liquid water, alcohol, hydrocarbon, other liquids, or combinations thereof, can be aerosolized in order to improve mechanical properties, bonding between layers, or other properties and process improvements. The addition of aerosolized liquids such as hydrazine may be desired in some cases where a reduction in oxygen concentration is desired or where the formation of nitrogen compounds is desired. Also, the addition of iron oxide ($Fe_2O_3$) to an aluminum alloy would result in local heating due to the chemical reaction of $Fe_2O_3$ and aluminum to form $Al_2O_3$ and iron, which is more commonly known as the thermite reaction, within the layers being formed by liquid metal jetting as described herein. The excess temperature resulting from this reaction would improve bonding between layers and reduce porosity. The addition of aerosolized nanoparticles, such as $Al_2O_3$, would likewise improve bonding between layers and significantly improve mechanical properties.

Other embodiments where the additive is a solid, particle, or powder may include the addition of ceramic particle or ceramic fibers, ceramic nanoparticles, or ceramic whiskers comprised of silicon carbide, graphite, boron, alumina-silica to aluminum alloys such as 2009, 2024, 7050, 7075, 6061, 4008 in order to improve stiffness, fatigue strength, as well as other properties. The addition of certain solids may enable the printing or jetting of alloys that may not normally be turned into metal matrix composites. As stated previously, the entire part or only certain areas or the part could be selectively reinforced with the in situ modification by solids of liquid metal printing materials. Other embodiments may include the addition of solid catalysts such as nickel, platinum, or palladium for use in chemical processing equipment. Certain embodiments may include the addition of solid dielectrics such as barium titanate or calcium copper titanate where dielectric properties may be desired in printed metal objects. Other embodiments may include the addition of solid ferromagnetic particles including iron or nickel to impart magnetic properties, the addition of aluminum or nickel to improve galvanic or corrosion compatibility for assemblies that are susceptible to dissimilar metal corrosion. Alternate embodiments may include the addition of precipitate forming elements such as magnesium, silicon, zinc, or copper into aluminum alloys in order to improve heat treatment response, the addition of aluminum oxide to metal alloys such as aluminum 4008 to modify electrical properties, coefficient of thermal expansion, or other thermal properties, or the addition of magnetic material particles such as rare earth magnets into alloys that are typically non-magnetic such as aluminum 4008. Still other embodiments may include the addition of easily removed elements, such as by acid or alkaline digestion, such as zinc or aluminum to nickel or copper foam. These may be used in applications such as heat exchangers or high-surface area catalysts. Water soluble solids such as sodium chloride (NaCl), also referred to as table salt, or similar materials can be added for the purpose of introducing soluble supports or introducing porosity where desired for the purpose of increasing surface area, permitting gas or liquid flow, or reducing part weight. Flux, such as sodium fluoride (NaF), potassium fluoride ($KF_2$) or potassium fluoro aluminate ($K_{1-3}AlF_{4-6}$) or similar materials for aluminum alloys, can be added in order to improve bonding between layers.

FIGS. 3A-3F are a series of side cross-sectional views of a single liquid ejector jet configured for jetting modified metal compositions, illustrating various embodiments of metal modification, according to one or more embodiments. FIG. 3A is a side cross-sectional schematic of a liquid ejector jet 300 configured for use in a printing system capable of printing in situ modified metal compositions. As shown in FIG. 3A, the liquid ejector jet 300 defines a nozzle 302 portion having a gas shield 304 surrounding the nozzle 302 portion of the liquid ejector jet 300. The gas shield 304 surrounds the nozzle 302 and contains a first gas 306, also referred to as a cover gas that surrounds the nozzle 302 and liquid ejector jet 300 with the first gas 306. This gas or air shield 304 provides an air shield around an external portion of the nozzle 302 as described previously. The liquid ejector jet 300 may define an inner volume, also referred to as an internal cavity, which retains a molten or liquid printing material 310 in the inner volume of the liquid ejector jet 300. The printing material 310 may be or include a metal, a polymer, or the like, but in this case represents a metal. For example, the printing material 310 may be or include aluminum or aluminum alloy, introduced via a printing material supply or spool of a printing material wire feed 308, which as shown is an aluminum wire. Alternate embodiments may not utilize a wire feed introduction of printing material, but may alternatively include a powder feed, liquid feed, or other method or manner of introducing a printing material into the liquid ejector jet 300. The nozzle 302 of the liquid ejector jet 300 also defines a nozzle orifice 312. The printing material 310 retained within the nozzle 302 of the liquid ejector jet 300 is jetted through the nozzle orifice 312 in the form of one or more liquid drops 322. These liquid printing material drops 322 may be jetted on either a substrate, a previously jetted layer of drops or both and may form one or more layers of solidified droplets 326 to eventually form a 3D object. In the embodiment illustrated in FIG. 3A, an additive source 314 is located in proximity to the nozzle 302. This additive source 314 is coupled to the nozzle 302 of the liquid ejector jet 300 by an additive inlet 316. The additive inlet 316 delivers an additive 318, which as illustrated in FIG. 3A is a gas or vapor, from the additive source 314 to the gas shield 304 where the additive 318 is carried via a second gas 320 and combines with the first gas 306 and is then carried and flooded around and towards the nozzle 302 and nozzle orifice 312 to combine the additive 318 with the printing material droplets 322 to create modified droplets 324 of the liquid printing material 310 in proximity to an external portion of the nozzle 302. This process results in the additive 318 and printing material droplets 322 interacting via a chemical or physical mixing or reaction to create an in situ modified printing material 324. This in situ modified printing material may have a different physical or chemical composition than the original liquid printing material 310. The composition of the printing material modified droplets 324 may be changed throughout the material bulk or changed on a part of or all of the surface in terms of its composition. As shown in FIG. 3B, which is an enlarged portion of the liquid ejector jet 300 system of FIG. 3A, each of printing material modified droplets 324 is modified by exposure to and reaction with the additive 318, with any remaining or unreacted additive 318 left to be recycled and held within the gas shield 304 around the nozzle 302 portion of the liquid ejector jet 300 for future in situ modification of printing material droplets 322 during subsequent printing operations. After ejection and during or subsequently after the in situ modification of the printing material droplets 322 takes place to create printing material modified droplets 324, the printing material modified droplets 324 are then deposited or jetted onto a substrate or previously deposited or jetted layer of printing material modified droplets 324, resulting in one or more layers of solidified modified droplets 326. Certain embodiments related to the liquid ejector jet 300 as shown in FIGS. 3A and 3B may include a variety of gas sources or vaporized solid sources, such as gas tanks, bubblers, or other apparatus known to those skilled in the art in connection with or further coupled to the additive source 314 for the introduction of various gases or vapors into the liquid ejector jet 300. Exemplary gases may include carbon monoxide, hydrogen, silane, ammonia, nitrogen, carbon dioxide, hydrazine, hydrogen chloride, or a second inert gas as a carrier for a vaporized solid. It should be noted that in such a case, the second inert gas may be the same as the first inert gas that acts as the cover gas. In certain embodiments where a vaporized solid is used, the additive source 314 may include a furnace, heating element, oven, other reaction vessel, or combination thereof configured to and coupled with the additive inlet 316 to deliver a vaporized solid into the liquid ejector jet 300 system. Exemplary vaporized solids may include calcium, strontium, zinc, magnesium, aluminum, copper, aluminum chloride, lithium, other materials, or combinations thereof. In certain embodiments, for example, a 3D printed part having an aluminum composition with a higher concentration of copper on a surface layer may provide advantages related to secondary part fabrication processes, such as subsequent vapor deposition or other coating processes where having a conductive outer layer on a 3D part may be beneficial.

FIG. 3C is a side cross-sectional schematic of a liquid ejector jet 336 configured for use in a printing system capable of printing in situ modified metal compositions. As shown in FIG. 3C, the liquid ejector jet 336 defines a nozzle 302 portion having a gas shield 304 surrounding the nozzle 302 portion of the liquid ejector jet 336. The gas shield 304 surrounds the nozzle 302 and contains a first gas 306, also referred to as a cover gas that surrounds the nozzle 302 and liquid ejector jet 336 with the first gas 306. This gas or air shield 304 provides an air shield around an external portion of the nozzle 302 as described previously. The liquid ejector jet 336 may define an inner volume, also referred to as an internal cavity, which retains a molten or liquid printing material 310 in the inner volume of the liquid ejector jet 336. The printing material 310 may be or include a metal, a polymer, or the like, but in this case represents a metal. For example, the printing material 310 may be or include aluminum or aluminum alloy, introduced via a printing material supply or spool of a printing material wire feed 308, which as shown is an aluminum wire. Alternate embodiments may not utilize a wire feed introduction of printing material, but may alternatively include a powder feed, liquid feed, or other method or manner of introducing a printing material into the liquid ejector jet 336. The nozzle 302 of the liquid ejector jet 336 also defines a nozzle orifice 312. The printing material 310 retained within the nozzle 302 of the liquid ejector jet 336 is jetted through the nozzle orifice 312 in the form of one or more liquid drops 322. These liquid printing material drops 322 may be jetted on either a substrate, a previously jetted layer of drops or both and may form one or more layers of solidified droplets 334 to eventually form a 3D object. In the embodiment illustrated in FIG. 3C, an additive source 328 is located in proximity to the nozzle 302. This additive source 328 is coupled to the nozzle 302 of the liquid ejector jet 336 by an additive inlet 316. The additive inlet 316 delivers an additive 330, which as illustrated in FIG. 3C is an aerosolized liquid, from the additive source 328 to the gas shield 304 where the additive 330 is carried via a second gas 320 and combines with the first gas 306 and is then carried and flooded around and towards the nozzle 302 and nozzle orifice 312 to combine the additive 330 with the printing material droplets 322 to create modified droplets 332 of the liquid printing material 310 in proximity to an external portion of the nozzle 302. This process results in the additive 330 and printing material droplets 322 interacting via a chemical or physical mixing or reaction to create an in situ modified printing material 332. This in situ modified printing material may have a different physical or chemical composition than the original liquid printing material 310. The composition of the printing material modified droplets 332 may be changed throughout the material bulk or changed on a part of or all of the surface in terms of its composition. As shown in FIG. 3D, which is an enlarged portion of the liquid ejector jet 336 system of FIG. 3C, each of printing material modified droplets 332 is modified by exposure to and reaction with the additive 330, with any remaining or unreacted additive 330 left to be recycled and held within the gas shield 304 around the nozzle 302 portion of the liquid ejector jet 336 for future in situ modification of printing material droplets 322 during subsequent printing operations. After ejection and during or subsequently after the in situ modification of the printing material droplets 322 takes place to create printing material modified droplets 332, the printing material modified droplets 332 are then deposited or jetted onto a substrate or previously deposited or jetted layer of printing material modified droplets 332, resulting in one or more layers of solidified modified droplets 326. Certain embodiments related to the liquid ejector jet 336 as shown in FIGS. 3C and 3D may include a variety of gas sources or liquid aerosol sources or aerosol generator in connection with or further coupled to the additive source 328 for the introduction of various aerosolized liquids into the liquid ejector jet 336. Exemplary aerosolized liquids or additive mixtures may include solutions, dispersions, or combinations thereof, such as a sodium chloride solution, a potassium chloride solution, argon, nitrogen, helium, carbon dioxide, or a second inert gas as a carrier for a vaporized aerosolized liquid. It should be noted that in such a case, the second inert gas may be the same as the first inert gas that acts as the cover gas. In certain embodiments, the additive source 328 may include a furnace, heating element, oven, other reaction vessel, or combination thereof configured to and coupled with the additive inlet 316 to condition or aid in the delivery of an aerosolized liquid into the liquid ejector jet 336 system.

FIG. 3E is a side cross-sectional schematic of a liquid ejector jet 340 configured for use in a printing system capable of printing in situ modified metal compositions. As shown in FIG. 3E, the liquid ejector jet 340 defines a nozzle 302 portion having a gas shield 304 surrounding the nozzle 302 portion of the liquid ejector jet 340. The gas shield 304 surrounds the nozzle 302 and contains a first gas 306, also referred to as a cover gas that surrounds the nozzle 302 and liquid ejector jet 340 with the first gas 306. This gas or air shield 304 provides an air shield around an external portion of the nozzle 302 as described previously. The liquid ejector jet 340 may define an inner volume, also referred to as an internal cavity, which retains a molten or liquid printing material 310 in the inner volume of the liquid ejector jet 340. The printing material 310 may be or include a metal, a polymer, or the like, but in this case represents a metal. For example, the printing material 310 may be or include aluminum or aluminum alloy, introduced via a printing material supply or spool of a printing material wire feed 308, which as shown is an aluminum wire. Alternate embodiments may not utilize a wire feed introduction of printing material, but may alternatively include a powder feed, liquid feed, or other method or manner of introducing a printing material into the liquid ejector jet 340. The nozzle 302 of the liquid ejector jet 340 also defines a nozzle orifice 312. The printing material 310 retained within the nozzle 302 of the liquid ejector jet 340 is jetted through the nozzle orifice 312 in the form of one or more liquid drops 322. These liquid printing material drops 322 may be jetted on either a substrate, a previously jetted layer of drops or both and may form one or more layers of solidified droplets 346 to eventually form a 3D object. In the embodiment illustrated in FIG. 3E, an additive source 328 is located in proximity to the nozzle 302. This additive source 328 is coupled to the nozzle 302 of the liquid ejector jet 340 by an additive inlet 316. The additive inlet 316 delivers an additive 342, which as illustrated in FIG. 3E is a solid particulate, powder, nanoparticle, whisker, nanotube, or mixture thereof, from the additive source 328 to the gas shield 304 where the additive 342 is carried via a second gas 320 and combines with the first gas 306 and is then carried and flooded around and towards the nozzle 302 and nozzle orifice 312 to combine the additive 342 with the printing material droplets 322 to create modified droplets 344 of the liquid printing material 310 in proximity to an external portion of the nozzle 302. This process results in the additive 342 and printing material droplets 322 interacting via a chemical or physical mixing or reaction to create an in situ modified printing material 344. In the case of a solid additive 342, it may be more likely that the additive 342 may be embedded in the surface of the printing material droplets 322. This in situ modified printing material may have a different physical or chemical composition than the original liquid printing material 310. The composition of the printing material modified droplets 344 may be changed throughout the material bulk or changed on a part of or all of the surface in terms of its composition. As shown in FIG. 3F, which is an enlarged portion of the liquid ejector jet 340 system of FIG. 3E, each of printing material modified droplets 344 is modified by exposure to and reaction with the additive 342, with any remaining or unreacted additive 342 left to be recycled and held within the gas shield 304 around the nozzle 302 portion of the liquid ejector jet 340 for future in situ modification of printing material droplets 322 during subsequent printing operations. After ejection and during or subsequently after the in situ modification of the printing material droplets 322 takes place to create printing material modified droplets 344, the printing material modified droplets 344 are then deposited or jetted onto a substrate or previously deposited or jetted layer of printing material modified droplets 344, resulting in one or more layers of solidified modified droplets 346. Certain embodiments related to the liquid ejector jet 340 as shown in FIGS. 3E and 3F may include a variety of solid powder or particulate sources or in connection with or further coupled to the additive source 328 for the introduction of various solids additives into the liquid ejector jet 340 system. Exemplary powders may include carbon-based materials, such as carbon nanotubes, graphite, graphene, or spherical carbon, metal borides, metal oxides, such as oxides of titanium, silicon, iron, calcium, aluminum, copper, ferromagnetic solids, such as iron, water-soluble powders such as sodium chloride (NaCl), potassium chloride (KCl), lithium chloride (LiCl), calcium chloride ($CaCl_2$), magnesium chloride ($MgCl_2$), or similar, or a second inert gas as a carrier for a solid, powder, or particulate. It should be noted that in such a case, the second inert gas may be the same as the first inert gas that acts as the cover gas. In certain embodiments where a solid additive is used, the additive source 328 may include a powder hopper, auger, fluidized powder bed apparatus, vibratory-assisted powder delivery apparatus, electrostatic-assisted powder delivery system, furnace, heating element, oven, other reaction vessel, or combination thereof configured to and coupled with the additive inlet 316 to deliver a solid into the liquid ejector jet 340 system.

Embodiments as described in the foregoing examples may include the use or fabrication of particular alloys or metal matrix materials not manufacturable by typical methods or means. For example, alloys high strength in one area and better ductility in another as well as alloys having variable or tailorable thermal or electrical conductivity, strength, hardness, ductility, and local modification of properties within a part may also be possible. Materials having thermal mismatches may be constructed as well. Materials using flammable materials or additives may be fabricated in a safer. More controlled environment as compared to conventional processes without the use of vacuum systems or other flammable powder mitigation systems. Corrosion resistance may be imparted to metal materials by adding aluminum or other material additives. Water or oxygen or other materials may be added to the printing of metal parts or components to embrittle metal or metal alloy parts. Additional advantages of embodiments described herein include finer control of tailoring properties, reduced cost, improved productivity, the modification of localized areas within a part, or facile fabrication of gradient layer type alloys through a bulk material by gradually changing additive levels during printing operations. Specialized configurations of part architecture may also be possible with embodiments as described herein. Materials may be constructed such as honeycomb or other structures having an internal structure composition differing from the external structure composition. Other materials such as aluminum coated steel, or materials having fine dispersion of grain refiners or subtractive additives may be fabricated, with only specific portions of the structure having such compositional variations. The formation of various composites, nanocomposites, or alloys may also be fabricated by embodiments of the liquid metal jetting systems as described herein. Certain embodiments may be employed where a gas and secondary additive gas combined, then injected into the metal jetting system, a gas is injected, then a secondary additive evaporated, then combined within the metal jetting system.

Figure 4:
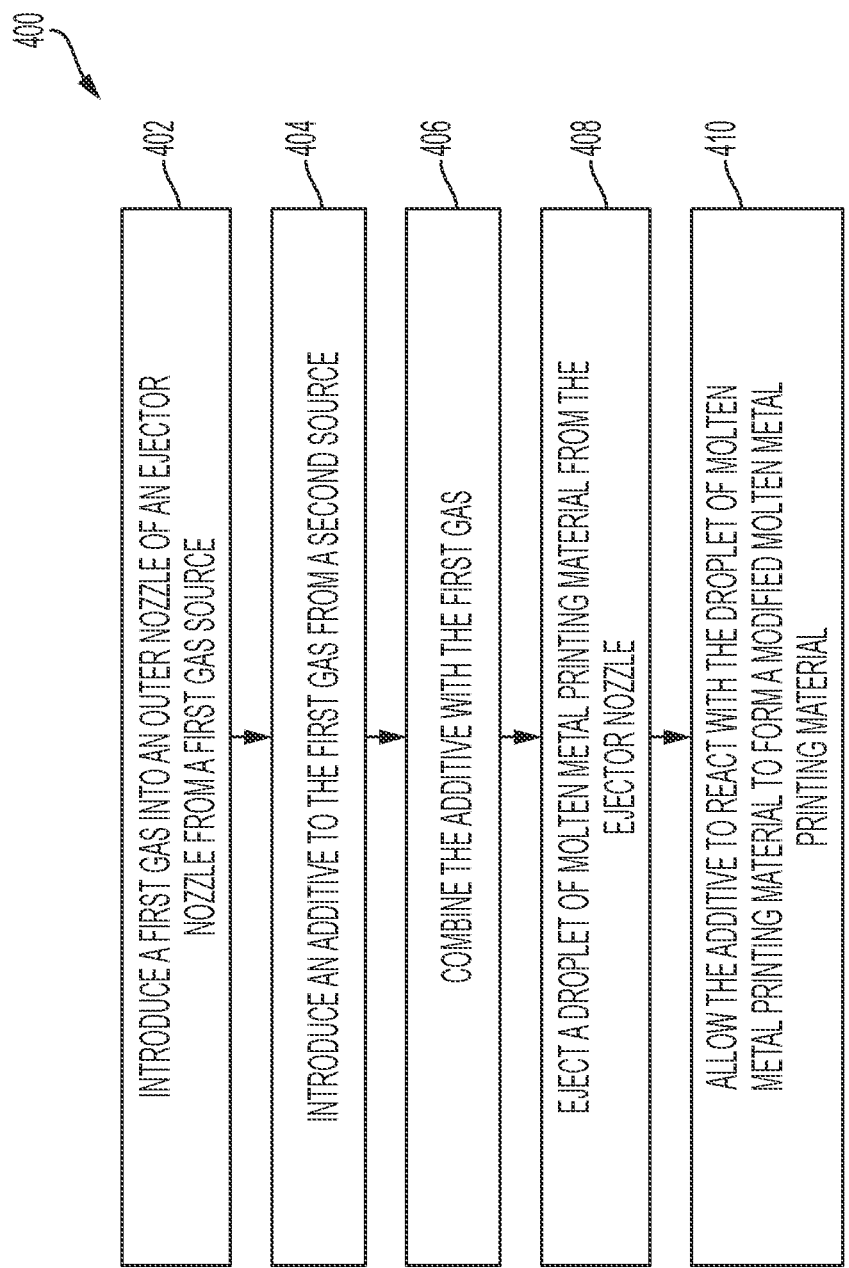
FIG. 4 is a flowchart illustrating a method of metal jetting a modified metal, according to an embodiment.

FIG. 4 is a flowchart illustrating a method of metal jetting a modified metal, according to an embodiment. The method of metal jetting a modified metal 400 includes a step to introduce a first gas into an outer nozzle of an ejector nozzle from a first gas source 402, followed by a step to introduce an additive to the first gas from a second source 404. The next steps in the method of metal jetting a modified metal 400 are to combine the additive with the first gas 406, eject a droplet of molten metal printing material from the ejector nozzle 408, and allow the additive to react with the droplet of molten metal printing material to form a modified molten metal printing material 410. In certain embodiments, the first gas may be an inert gas. In alternate embodiments, the step to introduce an additive to the first gas from a second source 404 may include introducing a second gas from a second gas source, where the second gas comprises an inert gas. Certain embodiments may utilize carbon monoxide as the second gas. Exemplary embodiments of the method of metal jetting a modified metal 400 may include the step of introducing an additive to the first gas from a second source 404 further including aerosolizing a liquid to form an aerosolized liquid. This aerosolized liquid may be a sodium chloride solution, and in some embodiments may include combining the aerosolized liquid with a second gas from a second gas source.

Alternate embodiments of the method for metal jetting modified metal 400 may include the step of introducing an additive to the first gas from a second source 404 which may include combining a powder with a second gas from a second gas source to suspend the powder in the second gas and introducing the combined powder and second gas to the first gas. In certain embodiments, the powder may a water soluble powder, a ferromagnetic material, such as iron. In some embodiments, the powder used in the step of introducing an additive to the first gas from a second source 404 may include a metal catalyst such as nickel, platinum, palladium, or a combination thereof.

Certain embodiments of the method for metal jetting modified metal 400 may include the step of introducing an additive to the first gas from a second source 404 which includes heating a solid to form a vaporized solid, and alternatively combining the vaporized solid with a second gas from a second gas source. In exemplary embodiments, the vaporized solid may include a grain refiner, such as strontium, or other vaporized solids, such as calcium. The method for metal jetting modified metal 400 may also include ejecting a droplet of molten metal printing material from the ejector nozzle, allowing the combination of the first inert gas and the powder suspended in the second inert gas to react with the droplet of molten metal printing material to form a modified molten metal printing material, or depositing a droplet of the modified molten metal printing material onto a substrate or a solid printing material. Alternate embodiments of the method for jetting modified metal compositions may include modification of concentrations of additives during the process, or "on the fly." The ratio of deposition may be controlled by controlling or changing the ratio of flow rates, such as by regulating pressure of gas sources or other process controls. Further embodiments of the method for jetting modified metal compositions may include changing a composition of a printed part from layer to layer. The modification may also be employed or enacted in an intermittent fashion by turning on and turning off the modification process or additive source input into the system.

The method for jetting modified metal compositions may include forming a weak boundary layer for a "breakaway" section or interface between a support structure and a product structure. In certain embodiments, the adding of oxygen or other embrittling agent or additive may be used in certain areas of a part to enable more facile separation of support structure from the main or desired printed component or part. Breakaway supports or interfaces may also be constructed by meter out additives or printing material compositions in a variable manner only at specific points or printed parts portions as needed. For example, a secondary gas regulator may be turned on, turned off, or regulated to deliver a quantity of additive to provide properties facilitating a breakaway or easily separate component portion. This method may create a chemical or physical layer disruption as well as a compositional disruption resulting in easier breakage at a specific location in a part structure.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for metal jetting, comprising:
   introducing a first gas into an outer nozzle of an ejector nozzle from a first gas source;
   introducing an additive to the first gas from a second source and into an additive inlet external to and coupled to the ejector nozzle;
   combining the additive with the first gas;
   ejecting a droplet of molten metal printing material from the ejector nozzle;
   allowing the additive to react with the droplet of molten metal printing material; and modifying a composition of the molten printing material with the additive during ejection to form a modified molten metal printing material.

2. The method for metal jetting of claim 1, wherein the first gas comprises an inert gas.

3. The method for metal jetting of claim 1, wherein introducing an additive to the first gas further comprises introducing a second gas from a second gas source.

4. The method for metal jetting of claim 3, wherein the second gas comprises an inert gas.

5. The method for metal jetting of claim 3, wherein the second gas comprises carbon monoxide.

6. The method for metal jetting of claim 1, wherein introducing an additive to the first gas from a second source further comprises aerosolizing a liquid to form an aerosolized liquid.

7. The method for metal jetting of claim 6, wherein the aerosolized liquid comprises a sodium chloride solution.

8. The method for metal jetting of claim 6, wherein introducing an additive to the first gas from a second source further comprises combining the aerosolized liquid with a second gas from a second gas source.

9. The method for metal jetting of claim 1, wherein introducing an additive to the first gas from a second source further comprises:
   combining a powder with a second gas from a second gas source to suspend the powder in the second gas; and
   introducing the combined powder and second gas to the first gas.

10. The method for metal jetting of claim 9, wherein the powder comprises a water soluble powder.

11. The method for metal jetting of claim 9, wherein the powder comprises a ferromagnetic material.

12. The method for metal jetting of claim 11, wherein the ferromagnetic material further comprises iron.

13. The method for metal jetting of claim 9, wherein the powder comprises nickel, platinum, palladium, or a combination thereof.

14. The method for metal jetting of claim 1, wherein introducing an additive to the first gas from a second source further comprises heating a solid to form a vaporized solid.

15. The method for metal jetting of claim 14, wherein introducing an additive to the first gas from a second source further comprises combining the vaporized solid with a second gas from a second gas source.

16. The method for metal jetting of claim 14, wherein the vaporized solid comprises a grain refiner.

17. The method for metal jetting of claim 14, wherein the vaporized solid comprises strontium.

18. The method for metal jetting of claim 14, wherein the vaporized solid comprises calcium.

19. A method for metal jetting, comprising:
   introducing a first inert gas into an outer nozzle of an ejector nozzle from a first gas source;
   combining a powder with a second inert gas from a second inert gas source to suspend the powder in the second inert gas;
   combining the powder suspended in the second inert gas with the first inert gas;
   ejecting a droplet of molten metal printing material from the ejector nozzle;
   introducing the powder suspended in the second inert gas and the first inert gas to the molten metal printing material via an additive inlet external to and coupled to the ejector nozzle;
   allowing the combination of the first inert gas and the powder suspended in the second inert gas to react with the droplet of molten metal printing material; and
   modifying a composition of the molten printing material with the powder during ejection to form a modified molten metal printing material; and
   depositing a droplet of the modified molten metal printing material onto a substrate or a solid printing material.

* * * * *